(12) United States Patent
Nakasone

(10) Patent No.: US 7,832,054 B2
(45) Date of Patent: Nov. 16, 2010

(54) FREE STOP HINGE

(75) Inventor: Hisashi Nakasone, Yokohama (JP)

(73) Assignee: Piolax Inc., Yokohama-Shi (JP)

( * ) Notice: Subject to any disclaimer, the term of this patent is extended or adjusted under 35 U.S.C. 154(b) by 0 days.

(21) Appl. No.: 11/998,140

(22) Filed: Nov. 28, 2007

(65) Prior Publication Data
US 2008/0120809 A1    May 29, 2008

(30) Foreign Application Priority Data
Nov. 29, 2006    (JP) .............................. 2006-321476

(51) Int. Cl.
*E05C 11/08* (2006.01)
(52) U.S. Cl. ...................................... 16/337
(58) Field of Classification Search .................. 16/337, 16/342, 328, 277, 380, 338, 339, 340; 379/433.13; 248/371; 49/386, 387, 397, 398; 220/264, 220/829, 263, 830, 844
See application file for complete search history.

(56) References Cited

U.S. PATENT DOCUMENTS

| | | | | |
|---|---|---|---|---|
| 4,018,104 A * | 4/1977 | Bland et al. | .................... | 74/531 |
| 4,620,344 A * | 11/1986 | Lewis, Jr. | ..................... | 16/337 |
| 6,671,927 B2 * | 1/2004 | Chen | ............................ | 16/339 |
| 6,676,098 B2 * | 1/2004 | Lin | ............................. | 248/371 |
| 6,921,058 B2 * | 7/2005 | Becker et al. | ................ | 248/419 |
| 7,114,218 B1 * | 10/2006 | Lin | .............................. | 16/342 |
| 7,404,234 B2 * | 7/2008 | Lee et al. | ....................... | 16/322 |
| 7,421,762 B2 * | 9/2008 | Lu et al. | ........................ | 16/328 |
| 2004/0020935 A1 * | 2/2004 | Inari | ........................... | 220/830 |

FOREIGN PATENT DOCUMENTS

JP    2001-097128 A    4/2001

* cited by examiner

*Primary Examiner*—Victor Batson
*Assistant Examiner*—Matthew Sullivan
(74) *Attorney, Agent, or Firm*—Holtz, Holtz, Goodman & Chick, PC

(57) ABSTRACT

The present invention provides a free stop hinge which can be stopped at any angle, the hinge having a structure in which a pressing force by means for pressing can be set with little variation and can be adjusted easily. The free stop hinge of the present invention connects an opening and closing member to a main body portion so that the opening and closing member can be opened and closed with respect to the main body portion and can be stopped at an arbitrary opening angle, which includes a hinge base and a hinge arm rotatably connected to the hinge base through an intermediation of a support shaft. The hinge base and the hinge arm are provided with bearing plates having shaft holes, respectively. Between the bearing plates, a friction plate having a shaft hole is disposed and the hinge arm is supported by a support shaft so as to be rotatable with respect to the hinge base. There is disposed a compression coil spring for biasing one of the bearing plates so as to be pressed to another of the bearing plates through an intermediation of the friction plate the friction plate.

8 Claims, 11 Drawing Sheets

FREE STOP HINGE

BACKGROUND OF THE INVENTION

1. Field of the Invention

The present invention relates to a free stop hinge which can be stopped at any angle, for example, for enabling stoppage of a lid provided to a center console between a driver seat and a passenger seat, which are provided in a forward portion of a vehicle, so as to be capable of being opened and closed.

2. Description of the Related Art

For example, between a driver seat and a passenger seat located in a forward portion of a vehicle, there is provided a center console. The center console in which an accommodation portion capable of accommodating small objects or the like is provided is widely used, and a lid is provided to the accommodation portion so as to be capable of being opened and closed. For the center console mentioned above, JP 2001-97128 A discloses a structure in which a lid (cover body) is connected to a console box main body through an intermediation of a hinge so as to be capable of being opened and closed. Further, for the lid, for example, also-called 'free stop hinge' may be adopted, the hinge having a structure with which the lid can be opened by being lifted by a hand, and even when the hand is moved off from the lid after opening the lid, the lid is not closed and can be stopped at an arbitrary opening angle.

A free stop hinge 100 of the related art, illustrated in FIGS. 11 and 12, includes a hinge base 110 and a pair of hinge arms 120 and 120 which are rotatably connected to both sides of the hinge base 110 through an intermediation of support shafts 130, respectively. On the both sides of the hinge base 110, bearing plates 111 and 111 each having a first shaft hole 111a are provided upright, respectively. Base end portion of each of the hinge arms 120 and 120 is provided with a bearing plate 121 having a third shaft hole 121a.

On an outer side of the bearing plate 111 of the hinge base 110, the bearing plate 121 of the hinge arm 120 is provided through an intermediation of a resin washer 140. On an inner side of the same bearing plate 111 of the hinge base 110, another resin washer 140 is provided. On an outer side of the bearing plate 121 of the hinge arm 120, still another resin washer 140, a metal washer 145, and a plate spring 150 are provided.

In this state, a distal end portion of the support shaft 130 is allowed to pass through the first shaft hole 111a, the third shaft hole 121a, and insertion holes formed in the washers, and clamping fixation is performed by a nut 155, thereby allowing the pair of hinge arms 120 and 120 to be rotatably connected to the both sides of the hinge base 110, respectively.

As shown in FIG. 12, by a pressing force of the plate spring 150 which is flattened by being clamped by the nut 155, the bearing plate 121 of the hinge arm 120 is pressed through the intermediation of the metal washer 145 and the resin washer 140 on the outer side. As a result, when a lid fixed to the hinge arm 120 rotates, by the resin washer 140 between the bearing plates 111 and 121, rotation resistance acts on the bearing plates 111 and 121 due to a frictional force. Accordingly, even when the lid tends to rotate in a closing direction by its own weight or the like, the lid is stopped, so the lid can be retained at an arbitrary opening angle.

In the free stop hinge of the related art, through adjustment of a clamping position of the nut 155, the pressing force of the plate spring 150 is set. In this case, there is a problem in that the plate spring 150 has an extremely high spring constant. Therefore, due to fluctuation in the clamping position of the nut 155, the pressing force varies greatly, where a setting to a desired pressing force is difficult, and an adjustment operation is also not easy. For example, in a case where the nut 155 is firmly clamped, the pressing force of the plate spring 150 becomes larger, so free stopping can be achieved with reliability, but at the same time, there arises a problem in that a larger force is needed when lifting the lid. On the other hand, in a case where the nut 155 is loosely clamped, the lid can be lifted easily, but at the same time, there arises a problem in that the frictional force is weakened, so the free stopping is not achieved with reliability.

SUMMARY OF THE INVENTION

It is therefore an object of the present invention to provide a free stop hinge which can be stopped at any angle, the hinge having a structure with which variation in pressing force by pressing means can be set small and adjustment of the pressing force is easy.

In order to achieve the above-mentioned object, according to a first aspect of the present invention, there is provided a free stop hinge for connecting an opening and closing member to a main body portion so that the opening and closing member can be opened and closed with respect to the main body portion and can be stopped at an arbitrary opening angle, the free stop hinge including: a hinge base to be fixed to either one of the main body portion or the opening and closing member, the hinge base being provided with a bearing plate having a shaft hole; a hinge arm to be fixed to the other one of the main body portion or the opening and closing member, the hinge arm being provided with a bearing plate having a shaft hole; a support shaft inserted through said both shaft holes, to connect the hinge base and the hinge arm to each other, to thereby support the hinge arm in a rotatable manner with respect to the hinge base; a friction plate having shaft hole disposed between the bearing plate of the hinge base and the bearing plate of the hinge arm; and a compression coil spring, in which the compression coil spring is disposed to press either one of the bearing plates of the hinge base or the hinge arm such that said bearing plate pressed by the compression coil spring is biased to the other one of the bearing plates of the hinge base or the hinge arm through an intermediation of the friction plate.

In the above-mentioned aspect, between the bearing plates of the hinge base and the hinge arm, respectively, there is disposed the friction plate. There is also provided the compression coil spring for pressing one of the bearing plates to the other of the bearing plates through the intermediation of the friction plate. Accordingly, each of the bearing plates receives rotation resistance by the friction plate, thereby making it possible to retain the opening and closing member at an arbitrary opening angle. Further, by using the compression coil spring as pressing means, and by setting the number of windings, a spring constant, or the like of the compression coil spring, a pressing force can be set accurately and uniformly. Accordingly, it becomes easier to adjust a frictional force at a time of rotation within a range in which free stopping is possible and a large force is not required for the rotation, thereby making it possible to enhance workability.

According to a second aspect of the present invention, there is provided a free stop hinge according to the first aspect of the present invention further including a resin cover having a shaft hole through which the support shaft is inserted, in which: the resin cover is provided between the compression coil spring and either one of the bearing plates of the hinge base or the hinge arm which is pressed by the compression coil spring; and the resin cover is prevented from rotating with respect to either one of the hinge base or the hinge arm which has the other one of the bearing plates of the hinge base or the hinge arm.

In the above-mentioned aspect, the compression coil spring is disposed so as to press one of the pair of bearing plates to the other thereof, in which one end of the compression coil spring abuts on the one of the pair of bearing plates and the other end thereof abuts on the other member which rotates with respect to said bearing plate. Accordingly, when said bearing plate rotates with respect to the other member, the compression coil spring is normally twisted at both ends thereof. However, in this embodiment of the present invention, even when the one of the pair of bearing plates with respect to the other member, the resin cover is prevented from rotating with respect to the hinge base or the hinge arm including the other of the pair of bearing plates. Therefore, relative rotation does not occur between the resin cover and the compression coil spring, so it is possible to prevent the compression coil spring from being twisted. As a result, an elastic bias force of the compression coil spring can act on the bearing plate in a stable manner.

According to third and fourth aspects of the present invention, there is provided a free stop hinge in which, in the first and second aspects of the present invention, respectively: the support shaft has a shaft portion inserted through the shaft holes and a receiving seat of a flange shape formed on a base end of the shaft portion; and the compression coil spring is disposed to an outer periphery of the support shaft, a base end portion of the compression coil spring abutting on the receiving seat and a distal end portion of the compression coil spring abutting on the bearing plates directly or through the resin cover.

In the above-mentioned aspects, the one end portion of the compression coil spring is supported by the receiving seat of the support shaft. In this state, the shaft portion is inserted through an inside of an inner periphery of the compression coil spring, thereby making it possible to stably support the compression coil spring. Further, by the receiving seat and the shaft portion, the compression coil spring is temporarily retained on the outer periphery of the support shaft in advance, so assembly workability can be enhanced.

According to fifth and sixth aspects of the present invention, there is provided a free stop hinge in which, in the third and fourth aspects of the present invention, respectively: the hinge base is provided with a receiving plate, said receiving plate being disposed oppositely to the bearing plate at a predetermined interval; and the support shaft has one end thereof inserted and locked in a first shaft hole formed in the bearing plate of the hinge base and the other end thereof inserted and locked in a second shaft hole formed in the receiving plate.

In the above-mentioned aspects, both end portions of the support shaft are supported by the bearing plate and the receiving plate of the hinge base, respectively. Accordingly, the support shaft is attached in a stable manner, and backlash and tilt of the hinge arm supported through the support shaft are suppressed, so rotation is performed in a stable manner.

According to a seventh aspect of the present invention, there is provided a free stop hinge according to the second aspect of the present invention further including a torsion coil spring, in which: the resin cover has a tube portion extending coaxially with the support shaft; the compression coil spring is disposed on an inner periphery of the tube portion; the torsion coil spring disposed on an outer periphery of the tube portion; and the torsion coil spring biases the hinge base and the hinge arm so that the hinge arm rotates with respect to the hinge base in a direction of opening the opening and closing member.

In the above-mentioned aspect, even in a case where the opening and closing member has a predetermined weight and the opening and closing member cannot be supported by only the frictional force by the friction plate, the weight of the opening and closing member is supported by the frictional force in conjunction with a bias force of the torsion coil spring, thereby making it possible to realize free stopping. Further, the compression coil spring and the torsion coil spring are arranged so as to be coaxial with each other, thereby making it possible to decrease a width of the hinge, thereby to down size the hinge. And also the tube portion can prevent occurrence of abnormal noise, friction, or the like due to interference between the compression coil spring and the torsion coil spring.

According to an eighth aspect of the present invention, there is provided a free stop hinge in which, in the seventh aspect of the present invention: the hinge base is provided with a receiving plate, said receiving plate being disposed oppositely to the bearing plate at a predetermined interval; and the support shaft has one end thereof inserted and locked in a first shaft hole formed in the bearing plate of the hinge base and the other end thereof inserted and locked in a second shaft hole formed in the receiving plate; the tube portion of the resin cover has a distal end formed with one or more of protruding pieces each axially extending from an end surface thereof; the second shaft hole has a periphery provided with a notch portion in which the protruding piece fits; and the compression coil spring has an outer diameter which is smaller than an inner diameter of the second shaft hole.

In the above-mentioned aspect, the protruding piece formed on the distal end of the tube portion of the resin cover fits in the notch portion formed in the periphery of the second shaft hole formed in the receiving plate, thereby preventing the resin cover from rotating with respect to the hinge base. Accordingly, it is possible to prevent a spring load from being unstable, which is caused by rotation of the tube portion due to twisting the torsion coil spring provided to the outer periphery of the tube portion. Further, since the protruding piece formed on the distal end of the tube portion of the resin cover fits in the notch portion formed in the periphery of the second shaft hole, the end portion of the torsion coil spring provided to the outer periphery of the tube portion can be prevented from falling in a space between the outer periphery of the tube portion and the second shaft hole, thereby making it possible to prevent occurrence of interference between the compression coil spring and the torsion coil spring, abnormal noise, or friction. Further, when fitting the protruding piece in the notch portion of the second shaft hole, a center of the second shaft hole and a center of the tube portion can be allowed to substantially match with each other, thereby facilitating an operation of inserting the compression coil spring through the second shaft hole into the tube portion of the resin cover, in a state where compression coil spring is provided to the outer periphery of the support shaft.

According to ninth and tenth aspects of the present invention, there is provided a free stop hinge, in which, in the seventh and eighth aspects of the present invention, respectively: the resin cover has an outer tube portion extending coaxially with the support shaft and has, on an inner side of the outer tube portion, an inner tube portion extending coaxially with the support shaft as well; the compression coil spring is disposed between the inner tube portion and the outer tube portion; and the torsion coil spring is disposed on an outer periphery of the outer tube portion.

In the above-mentioned aspects, since the compression coil spring is disposed between the inner tube portion and the outer tube portion, an axial center of the compression coil spring and an axial center of the support shaft can coincide with each other more easily, thereby making it possible to impart a more stable load to the resin cover. Further, when inserting the compression coil spring from an end portion of the outer tube portion, with the inner tube portion being elongated, the compression coil spring can be more easily inserted by using the inner tube portion as a guide.

According to eleventh and twelfth aspects of the present invention, there is provided a free stop hinge in which, in the first and second aspects of the present invention, respectively: the hinge base is fixed to the main body portion; the hinge arm is fixed to the opening and closing member; the hinge base includes a pair of bearing plates disposed on both sides of the hinge base and a pair of receiving plates disposed on an inner side from said bearing plates, each of the receiving plates being disposed at a predetermined interval from said bearing plate; the support shaft has one end thereof inserted and locked in a first shaft hole formed in the bearing plate of the hinge base and the other end thereof inserted and locked in a second shaft hole formed in the receiving plate; and the hinge arm includes a pair of the hinge arms, so that each of the hinge arms has the bearing plate disposed to be brought into press contact with the inner side of the bearing plate of the hinge base through an intermediation of the friction plate.

In the above-mentioned aspects, the pair of hinge arms is provided inwardly from the bearing plates provided to both sides of the hinge base and the bearing plates of hinge arms are arranged so as to be brought into press contact with the bearing plates of the hinge base, respectively through the intermediation of the friction plate. Accordingly, the pair of hinge arms is arranged at a maximum interval onto the hinge base, thereby making it possible to stably retain the opening and closing member supported by those hinge arms.

According to thirteenth and fourteenth aspects of the present invention, there is provided a free stop hinge in which, in the first and second aspects of the present invention, respectively: the hinge base is provided with a receiving plate, said receiving plate being disposed oppositely to the bearing plate of the hinge base at a predetermined interval; and the compression coil spring is mounted while being compressed between the bearing plate and the receiving plate.

In the above-mentioned aspects, both end portions of the compression coil spring are supported by the bearing plate and the receiving plate provided to the hinge base, respectively. Accordingly, the compression coil spring can be retained in a stable manner. Further, a set length of the compression coil spring is determined depending upon accuracy of processing the spring, so a load thereof can be stabilized. Note that, the receiving plate can be provided to the hinge arm, but there is such a disadvantage that a rotation locus expands, thereby making space for hinge installation too large.

According to fifteenth and sixteenth aspects of the present invention, there is provided a free stop hinge in which, in the ninth and tenth aspects of the present invention, respectively: the inner tube portion extends to have a length shorter than a length of the outer tube portion; and the support shaft is inserted through an inside of the inner tube portion and provides a portion extruding from the inner tube portion, said portion extruding from the inner tube portion having a tapered shape whose diameter gradually increases.

In the above-mentioned aspects, the one end of the support shaft is inserted into the inner tube portion and the other end thereof extrudes from the inner tube portion and is gradually increased in diameter. Accordingly, the one end of the compression coil spring is supported by the outer periphery of the inner tube portion and the other end thereof is supported by the outer periphery of a large diameter portion of the support shaft. As a result, the compression coil spring can be supported without tilt. Further, when mounting the compression coil spring to the outer periphery of the support shaft at a time of assembly, positioning of the compression coil spring is performed while moving the compression coil spring along the large diameter portion of the support shaft, so an assembly operation is facilitated.

With the free stop hinge according to the present invention, either one of the bearing plate of the hinge base or of the hinge arm is pressed by the compression coil spring to the other of the bearing plate through the intermediation of the friction plate. Accordingly, both bearing plates receive resistance against rotation from each other through the intermediation of the friction plate, thereby making it possible to retain the opening and closing member at an arbitrary opening angle. Further, by selecting the number of windings, a spring constant, or the like, the pressing force of the compression coil spring can be set accurately and uniformly. Accordingly, it is possible to adjust the frictional force at the time of rotation within a range in which the free stopping is possible and a large force is not required for the rotation, thereby enhancing the workability.

DETAILED DESCRIPTION OF THE PREFERRED EMBODIMENTS

Hereinafter, with reference to FIGS. 1 to 8, an embodiment of a free stop hinge which can be stopped at any angle according to the present invention will be described.

Figure 8:
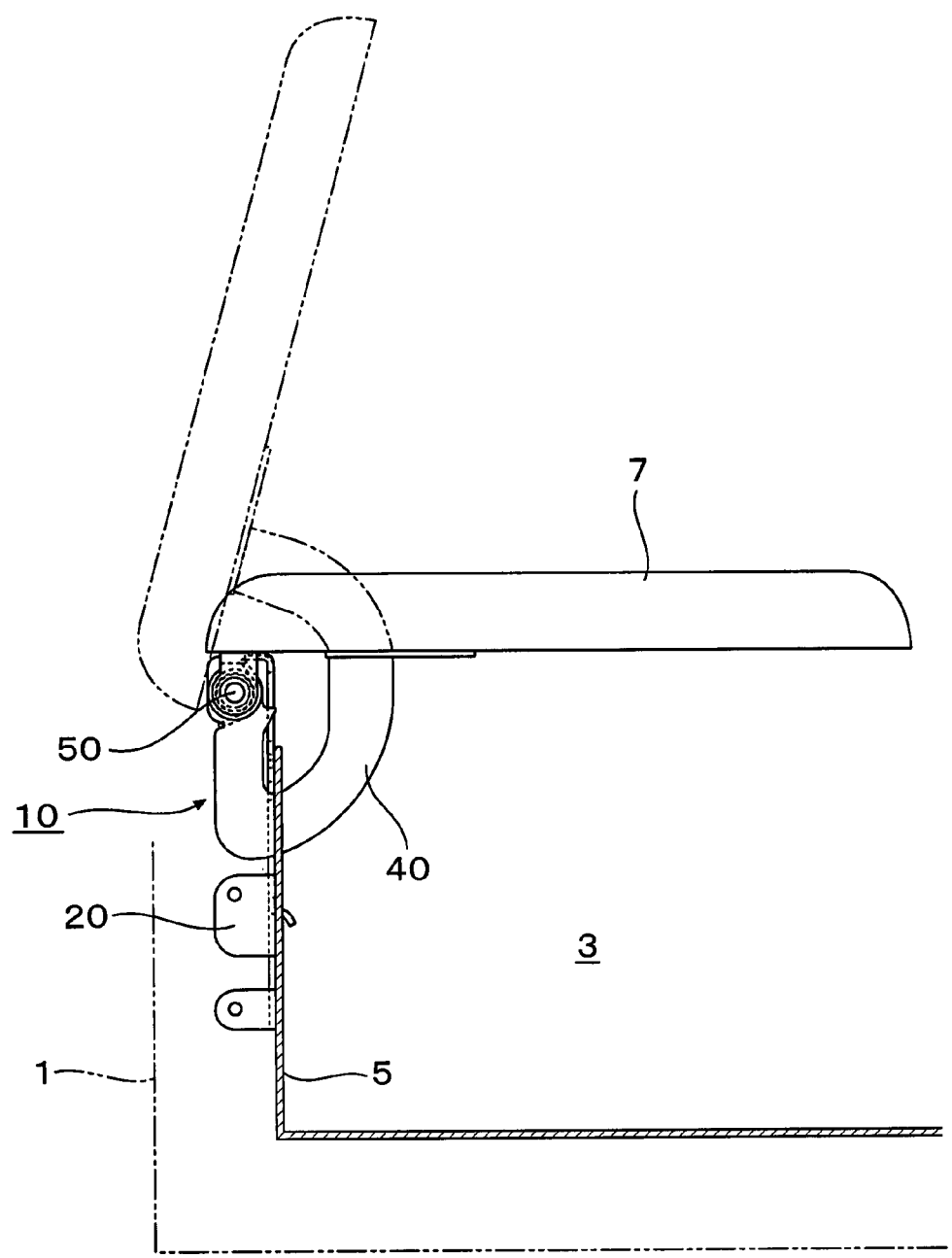
FIG. 8 is an explanatory view showing an operation of the free stop hinge.

A free stop hinge 10 (hereinafter, referred to as "hinge 10") is used for opening and closing a lid 7 provided to an accommodation portion 3 formed in a center console 1 provided between a driver seat and a passenger seat located in a forward portion of a vehicle as shown in FIG. 8, for example, and particularly, for free stopping by which a lid 7 can be stopped at an arbitrary opening angle.

Figure 1:
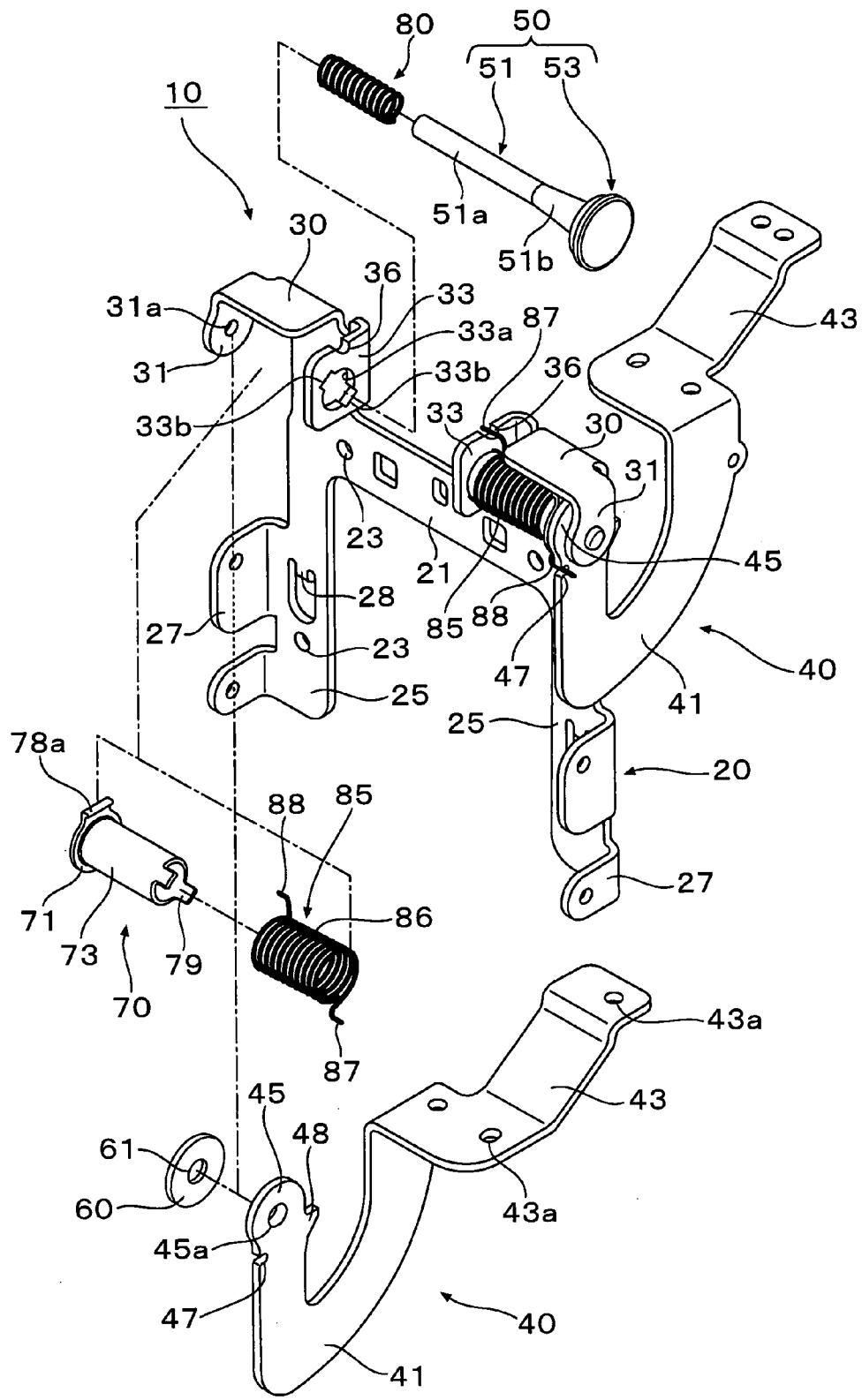
FIG. 1 is an exploded perspective view showing a free stop hinge according to an embodiment of the present invention.

With reference to FIGS. 1 and 8, the hinge 10 includes a hinge base 20 fixed to a mounting wall 5 of the accommodation portion 3 formed inside the center console 1, and a pair of hinge arms 40 and 40 each having a base end portion rotatably connected to each of both sides of the hinge base 20 through an intermediation of a support shaft 50 and a distal end portion fixed to the each of both sides on a back side of the lid 7. As shown in FIG. 8, the hinge base 20 is provided to a back surface side of the mounting wall 5 of the accommodation portion 3, and the lid 7 fixed through the intermediation of the hinge arms 40 is provided in a position above an opening portion of the accommodation portion 3, thereby making it possible to open and close the accommodation portion 3. In this embodiment, the lid 7 serves as an opening and closing member according to the present invention and the accommodation portion 3 serves as a main body portion according to the present invention.

Figure 2:
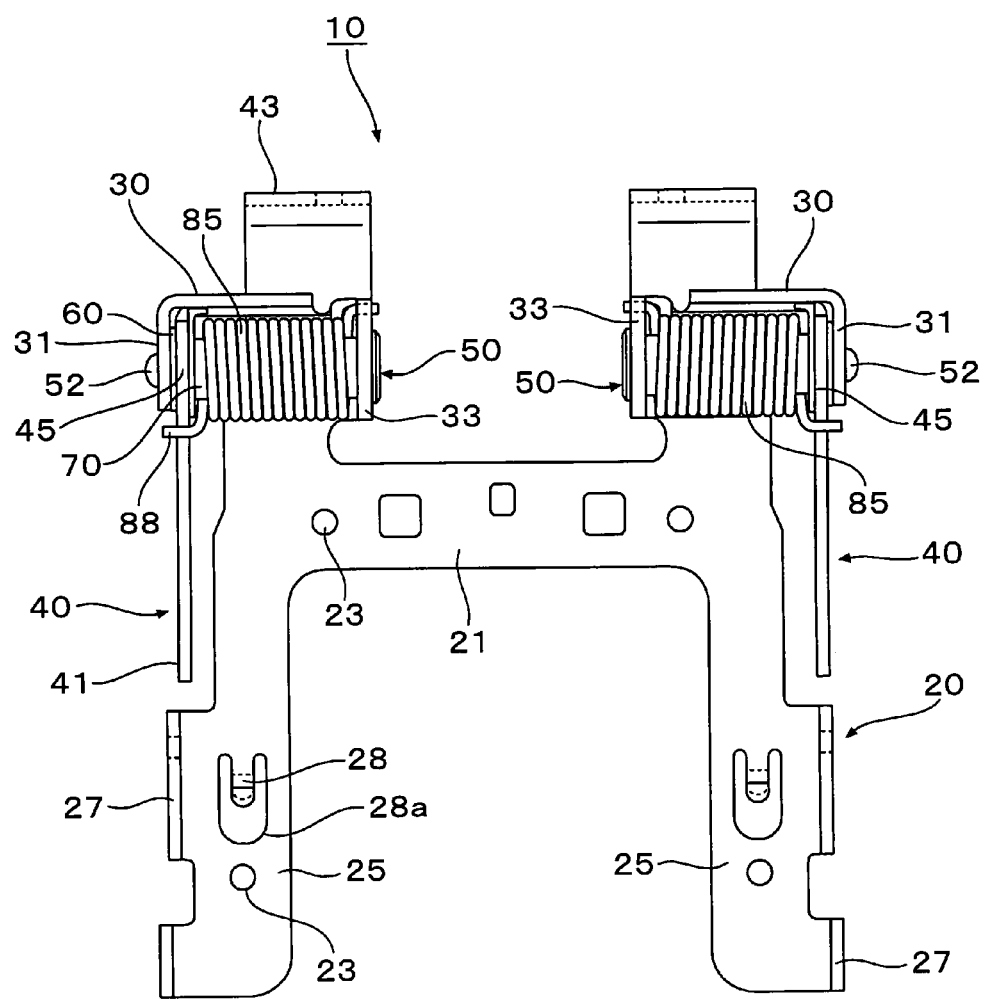
FIG. 2 is a front view of the free stop hinge.
Figure 3:
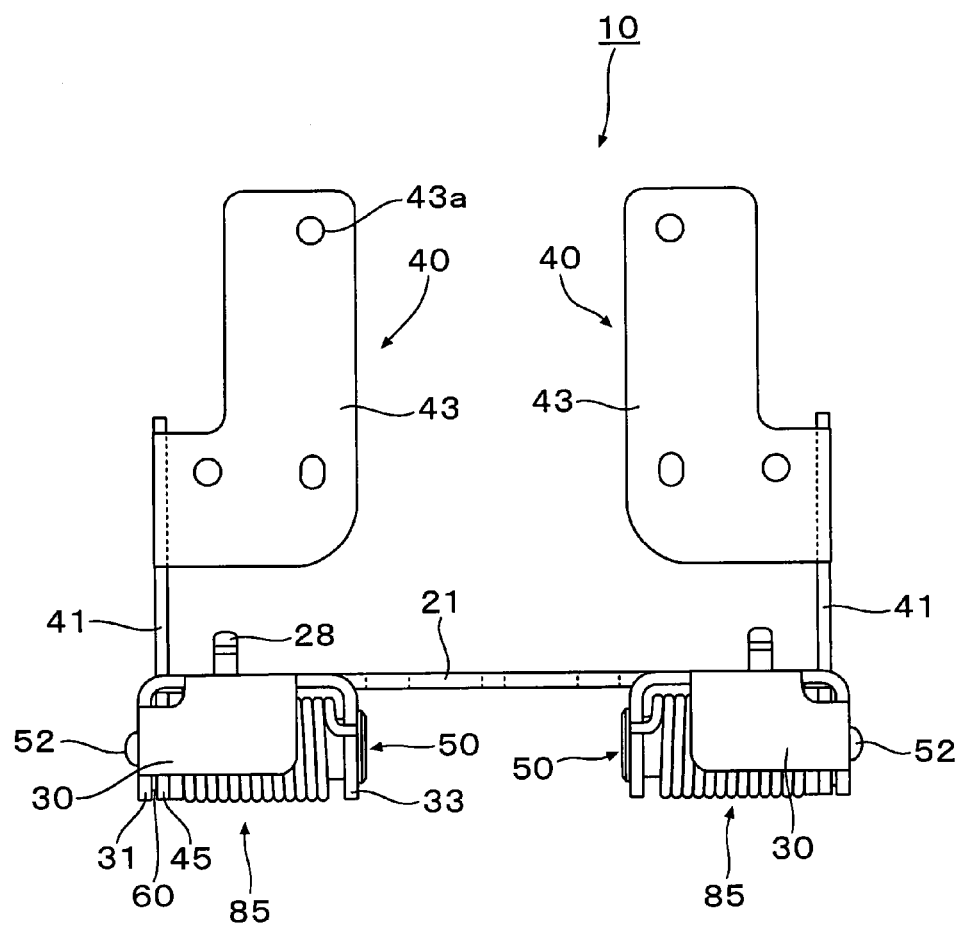
FIG. 3 is a plan view of the free stop hinge.
Figure 4:
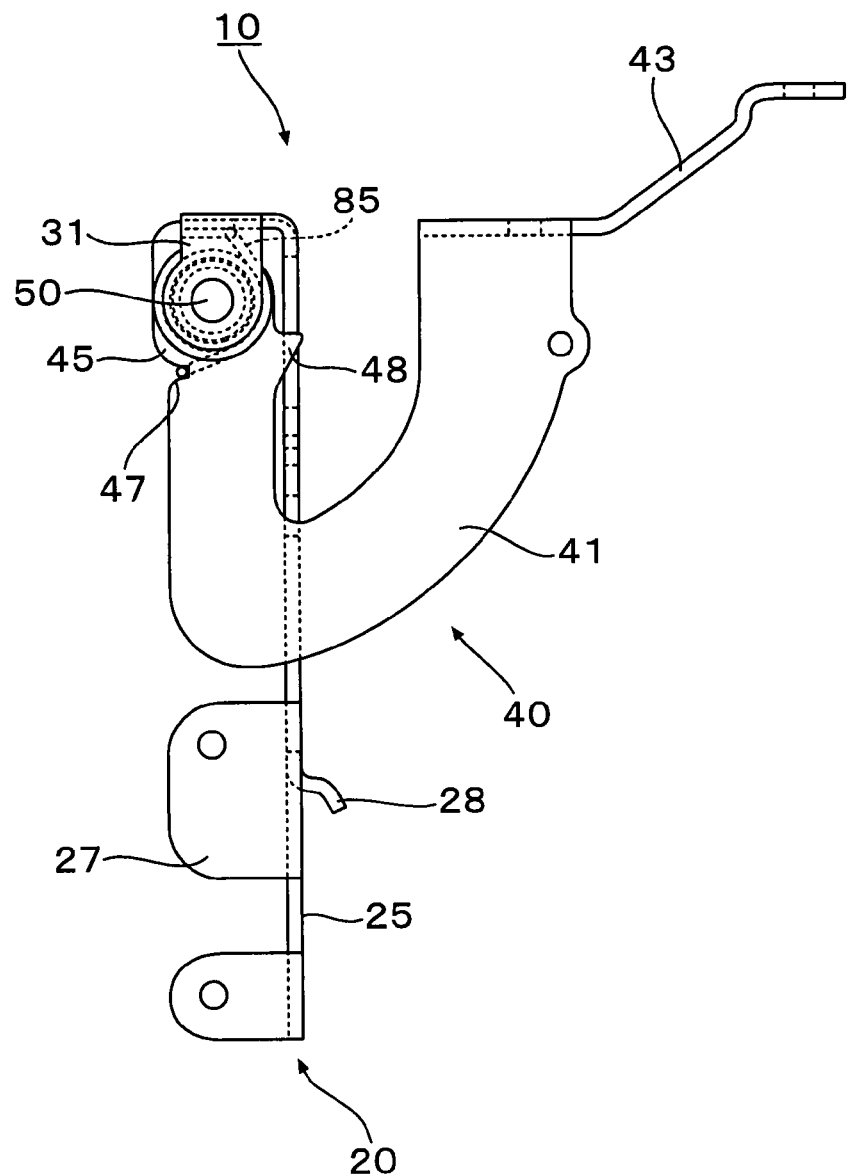
FIG. 4 is a right-side view of the free stop hinge.

With reference to FIG. 2 as well, the hinge base 20 is made of a metal plate material, includes a belt-like base portion plate 21 and a pair of side portion plates 25 and 25 extending from both sides of the base portion plate 21 in a right angle direction and in parallel to each other, and has a substantially H shape when viewed from front (refer to FIG. 2). Further, at predetermined portions of the plates, a plurality of mounting holes 23 are formed, thereby enabling mounting to the mounting wall 5 of the accommodation portion 3.

Further, on an outer side edge on a lower portion of each of the side portion plates 25, there are provided a plurality of fixing plates 27 upright toward an opposite side of a mounting surface with respect to the mounting wall 5 of the accommodation portion 3. The fixing plates 27 become portions to be fixed to a bracket (not shown) provided on the back surface side of the mounting wall 5. Further, in a position closer to a bottom portion with respect to a middle portion in a longitudinal direction of each of the side portion plates 25, a positioning piece 28 is formed by being folded toward a mounting surface side with respect to the mounting wall 5 through an intermediation of a square U-shaped slit 28a. The positioning pieces 28 are inserted into positioning holes (not shown) of the mounting wall 5, thereby positioning the hinge base 20.

Further, at an upper end portion of each of the side portion plates 25, a support plate 30 is folded toward the opposite side of the mounting surface with respect to the mounting wall 5. The support plate 30 extends to be longer than the outer side edge of the side portion plate 25 to protrude outwardly and be folded downwardly at distal end portion thereof, thereby providing a bearing plate 31 having a first shaft hole 31a formed in a center thereof, through which the support shaft 50 is inserted. In correspondence with the bearing plate 31, on an inner side edge on an upper portion of each of the side portion plates 25, there is formed a receiving plate 33 by being bent toward the opposite side of the mounting surface of the mounting wall 5 so that the receiving plate 33 is in a position opposed to the bearing plate 31 at a predetermined distance. Between the receiving plate 33 and the bearing plate 31, there is provided a resin cover 70 described later.

Further, in a central portion of the receiving plate 33, there is formed a second shaft hole 33a having a shaft center matching with a shaft center of the first shaft hole 31a. An inner diameter of the second shaft hole 33a is larger than an outer diameter of a compression coil spring 80 described later. Further, the second shaft hole 33a is formed to have the inner diameter so as to fit with an outer diameter of a receiving seat 53 described later of the support shaft 50, to allow insertion of the compression coil spring 80 therethrough from an outer side of the receiving plate 33, and to be capable of supporting the receiving seat 53 of the support shaft 50. Further, a pair of notch portions 33b and 33b are formed in a peripheral portion of the second shaft hole 33a so as to pass therethrough and to be opposed to each other. A pair of protruding pieces 79 and 79 described later of the resin cover 70 fit in the pair of notch portions 33b and 33b, thereby constituting portions for preventing the resin cover 70 from rotating with respect to the hinge base 20. Note that the notch portions 33b and 33b are inclined at a predetermined angle with respect to the support plate 30. Further, in a portion on an upper end edge of the receiving plate 33, there is formed a groove portion 36 with which a leg portion 87 extending from one end portion of a torsion coil spring 85 described later engages.

The hinge base 20 as described above is formed by being subjected to bending after punching a single metal plate in a predetermined shape. In this case, in a periphery of a punched portion, there is caused flash along a punching direction. In this embodiment, the bearing plate 31 is formed by being bent such that the flash caused on an inner peripheral edge of the first shaft hole 31a protrudes toward the receiving plate 33 side opposed thereto.

Figure 5:
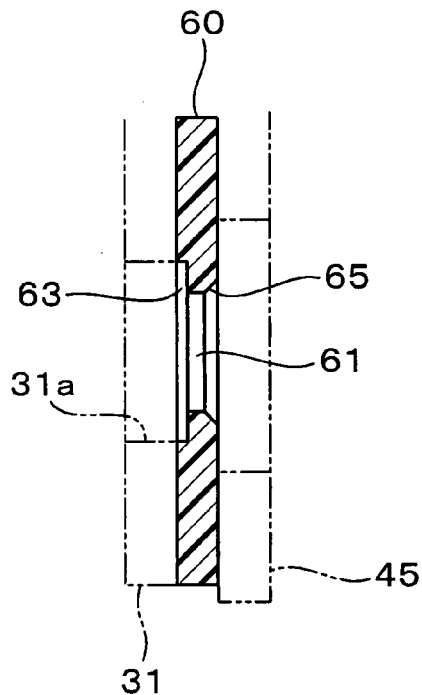
FIG. 5 is a sectional view of a friction plate as a component of the free stop hinge.

On inner sides of the bearing plates 31 and 31 formed on right and left sides of the hinge base 20 is provided with friction plates 60 and 60, respectively, which are made of a synthetic resin. Bearing plates 45 and 45 described later of the pair of hinge arms 40 and 40 are arranged so as to sandwich the friction plates 60 and 60 with the bearing plates 31 and 31, respectively. The friction plate 60, provided between the bearing plates 31 and 45, indirectly receives a bias force of the compression coil spring 80 to thereby apply a frictional force to a contact surface with the bearing plate 31 as well as a contact surface with the bearing plate 45. The friction plate 60 has a substantially disk shape, and has a fourth shaft hole 61 provided in a center thereof, through which a support shaft 50 is inserted. With reference to FIG. 5 as well, a flash receiving groove 63 having a circular shape of a predetermined depth is provided in one side surface of the friction plate 60 so as to communicate with the fourth shaft hole 61. The flash receiving groove 63 receives the flash caused on the inner peripheral edge of the first shaft hole 31a described above to thereby prevent lifting up of the friction plate 60 from the bearing plate 31, which enables the one side surface of the friction plate 60 to be brought into intimate contact with the inner side surface of the bearing plate 31. Further, on an opposite side of the flash receiving groove 63 with respect to the fourth shaft hole 61, there is formed a tapered surface 65 having a diameter gradually becoming larger toward an end surface of the friction plate 60, thereby increasing insertability of the support shaft 50.

Through the friction plates 60 and 60, on the inner sides of the pair of bearing plates 31 and 31 of the hinge base 20, there are arranged the pair of hinge arms 40 and 40. As shown in FIG. 1, the hinge arm 40 is formed of a metal plate like as the hinge base 20. In an upper end portion thereof, there is formed the bearing plate 45. The hinge arm 40 includes an arm portion 41 extending from the bearing plate 45 downwardly in a vertical direction and further extending obliquely upwardly after curving from a lower end portion of an extended portion, thereby forming a substantially V shape when viewed from a side, and a mounting portion 43 obtained by being bent inwardly at a distal end portion of the arm portion 41 and extending obliquely upwardly from an end of an inwardly bent portion. Further, in a center of the bearing plate 45, there is formed a third shaft hole 45a which has an inner diameter matching with an outer diameter of an insertion tube portion 77 described later of the resin cover 70 and through which the support shaft 50 is inserted through an intermediation of the insertion tube portion 77.

Further, in the vicinity of the bearing plate 45 of the arm portion 41 and in an outer side surface on an opposite side thereof with respect to the mounting portion 43, there is formed a groove portion 47 engaging with a leg portion 88 extending from another end portion of the torsion coil spring 85. Further, in the vicinity of the bearing plate 45 of the same arm portion 41 and on an inner side surface thereof on the mounting portion 43 side, there is formed a stopper portion 48 protruding therefrom. When the hinge arm 40 is opened to a maximum degree, the stopper portion 48 abuts on a side edge of the support plate 30 of the hinge base 20, thereby restricting an opening angle of the hinge arm 40 with respect to the hinge base 20. Further, the mounting portion 43 is formed with a plurality of mounting holes 43a. By the plurality of the mounting holes 43a, a distal end portion of the hinge arm 40 is fixed to a back surface of the lid 7.

The hinge arm 40 is provided on an inner side of the bearing plate 31 of the hinge base 20. Between the receiving plate 33 of the hinge base 20 and the bearing plate 45 of the hinge arm 40, there is provided the resin cover 70 for supporting both the compression coil spring 80 and the torsion coil spring 85.

Figure 6:
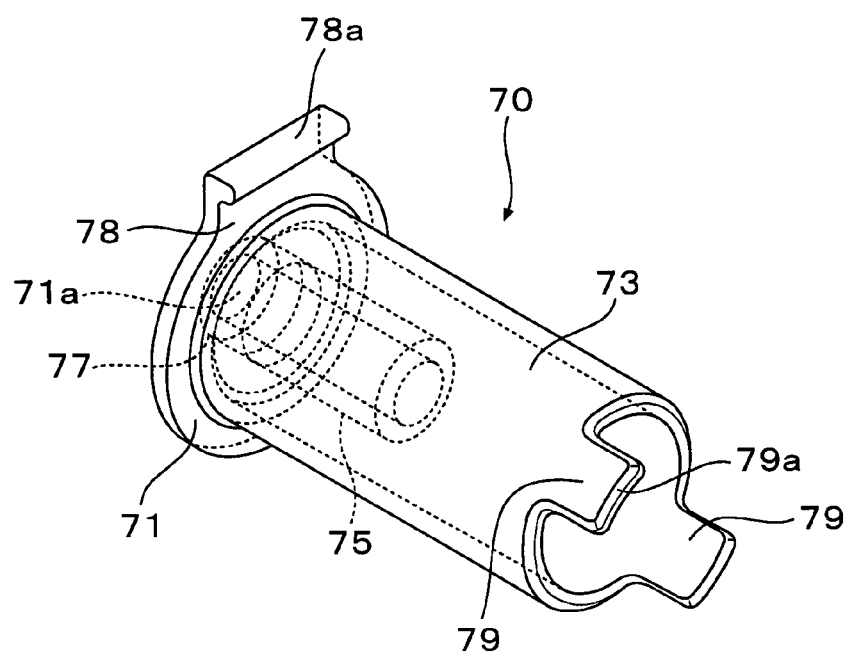
FIG. 6 is a perspective view of a resin cover as a component of the free stop hinge.

With reference to FIG. 6 as well, as like the friction plate 60, the resin cover 70 is formed of a synthetic resin. The resin cover 70 includes a base plate 71 of a circular shape having a fifth shaft hole 71a formed in a center thereof, in which the support shaft 50 is inserted, an outer tube portion 73 extending from an outer periphery of the fifth shaft hole 71a of the base plate 71 so as to be coaxial with the fifth shaft hole 71a, and an inner tube portion 75 extending from an inner peripheral edge of the fifth shaft hole 71a of the base plate 71 inside the outer tube portion 73 so as to be coaxial with the fifth shaft hole 71a. When viewed in an axial direction, the resin cover has a double-tube structure.

Figure 7:
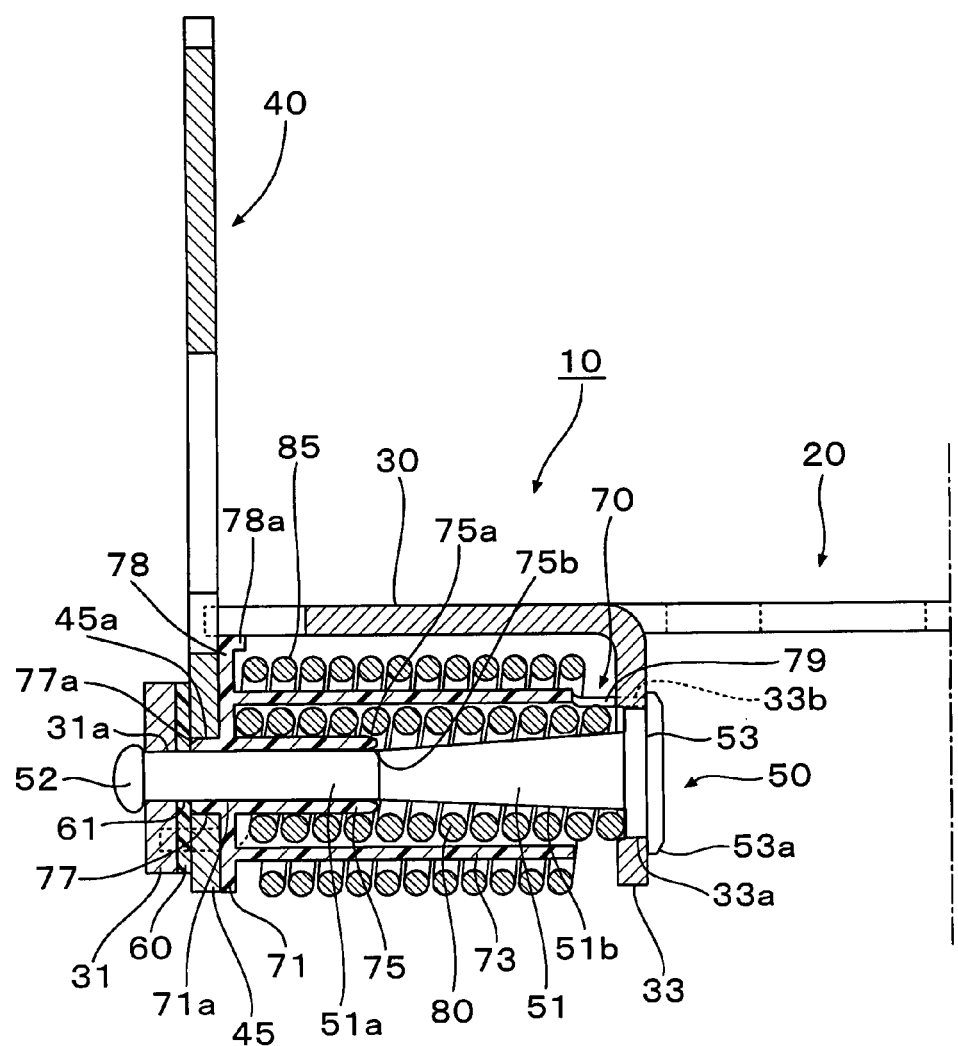
FIG. 7 is a main portion sectional view of the free stop hinge.

On an outer periphery of the outer tube portion 73, the torsion coil spring 85 is mounted. At the same time, the torsion coil spring 85 is supported by being abutted at an end surface thereof against a side surface of the base plate 71. On an outer periphery of the inner tube portion 75, the compression coil spring 80 is mounted. At the same time, the compression coil spring 85 is supported by being abutted at an end surface thereof against the side surface of the base plate 71. Further, as shown in FIG. 7, the inner tube portion 75 is formed to have a length smaller than the outer tube portion 73. In the inner tube portion 75, an insertion shaft portion 51a described later which extends while having a constant diameter of the shaft portion 51 of the support shaft 50 is inserted to be supported. Further, an outer periphery and an inner periphery of a distal end portion of the inner tube portion 75, there are formed an outer tapered surface 75a and an inner tapered surface 75b, respectively. By the outer tapered surface 75a, when the compression coil spring 80 is provided to the inner tube portion 75, the compression coil spring 80 is not caught on an inner periphery thereof, thereby being easily mounted. By the inner tapered surface 75b, the support shaft 50 can easily be inserted into the inner tube portion 75. Further, the resin cover 70 has the double-tube structure including the outer tube portion 73 and the inner tube portion 75, thereby allowing the compression coil spring 80 and the torsion coil spring 85 to be arranged so as to be coaxial with each other. Accordingly, the hinge 10 as a whole can be downsized and occurrence of abnormal noise, friction, or the like due to interference between the compression coil spring and the torsion coil spring can be prevented.

Further, from an outer peripheral edge of the fifth shaft hole 71a of the base plate 71, the insertion tube portion 77 protrudes to be inserted into the first shaft hole 31a of the hinge base 20 toward the opposite side of the inner tube portion 75. As a result, an axial center of the resin cover 70 can match with the axial center of each of the shaft holes. Note that, on an outer periphery of a distal end portion of the insertion tube portion 77 is formed with a tapered surface 77a having a diameter gradually decreasing toward the distal end (see FIG. 7), thereby ensuring insertability of the insertion tube portion 77 into the third shaft hole 45a. Further, in one portion on an outer periphery of the base plate 71, an extending piece 78 protrudes radially outwardly to have a predetermined width. From a distal end portion of the extending piece 78, an abutting portion 78a extends in the same direction as an extending direction of the outer tube portion 73. The abutting portion 78a abuts on the inner side surface of the support plate 30 of the hinge base 20, thereby stopping rotation of the resin cover 70 with respect to the hinge base 20.

Further, from an end surface of a distal end portion of the outer tube portion 73, a pair of protruding pieces 79 and 79 protrude. The protruding pieces 79 and 79 are formed obliquely with respect to the abutting portion 78a. When the abutting portion 78a is allowed to abut against the support plate 30 to be supported, the protruding pieces 79 and 79 fit to the notch portions 33b and 33b of the receiving plate 33 of the hinge base 20. The protruding pieces 79 and 79 are engaged with the notch portions 33b and 33b, thereby to stop the rotation of the resin cover 70 with respect to the hinge base 20 like as the abutment portion 78a functions. Further, each of the protruding pieces 79 is formed to have such a length that, when the base plate 71 is pressed to the bearing plate 45 of the hinge arm 40 by the compression coil spring 80, as shown in FIG. 7, a state where the protruding piece 79 is not removed from the notch portion 33b and the protruding piece 79 fits therein can be maintained. Further, the outer peripheral edge of each of the protruding portions 79 is formed with a tapered surface 79a, thereby increasing insertability when the protruding piece is engaged with the notch portion 33b.

Note that, of the above-mentioned two springs, the compression coil spring 80 has one end portion supported by the base plate 71 of the resin cover 70 and another end portion supported by the receiving seat 53 described later of the support shaft 50. The compression coil spring 80 is provided between the receiving plate 33 of the hinge base 20 and the bearing plate 45 of the hinge arm 40 while being compressed. The compression coil spring 80 functions as pressing means for pressing the bearing plate 45 on the hinge arm 40 side against the bearing plate 31 of the hinge base 20 through the intermediation of the friction plate 60. Further, as shown in FIG. 1, the torsion coil spring 85 includes a coil winding portion 86 and the leg portions 87 and 88 extending in L shapes from both end portions of the coil winding portion 86. The one leg portion 87 engages with the groove portion 36 of the hinge base 20 and the other leg portion 88 engages with the groove portion 47 of the hinge arm 40, thereby biasing the hinge arm 40 to rotate in an opening direction with respect to the hinge base 20. Even in a case where the lid 7 is so heavy that the lid 7 cannot be supported by only the frictional force generated by the friction plate 60, by the torsion coil spring 85, it is possible to achieve the free stopping by supporting a weight of the lid 7 by the frictional force in conjunction with a bias force of the torsion coil spring 85.

In the shaft holes formed in the above-mentioned members, the support shaft 50 is inserted to support. The support shaft 50 made of metal includes the shaft portion 51 to be inserted into the shaft holes and the receiving seat 53 having a flange shape connected to a base end of the shaft portion 51 for supporting the one end portion of the compression coil spring 80. With reference to FIGS. 1 and 7, the shaft portion 51 includes the insertion shaft portion 51a having an outer diameter matching with the inner diameter of each of the shaft holes and extending while having a constant diameter to be inserted in the shaft holes. The shaft portion 51 also includes a diameter-expanding portion 51*b* of a tapered shape which has a diameter gradually becoming larger from the base end portion of the insertion shaft portion 51*a* toward the receiving seat 53, and which extends out of the inner tube portion 75 of the resin cover 70 when the support shaft 50 is inserted in the shaft holes, to thereby support the inner periphery of the compression coil spring 80. Further, the receiving seat 53 is formed to have an outer diameter matching with an inner diameter of the second shaft hole 33*a* of the receiving plate 33 of the hinge base 20. Further, the receiving seat 53 increases its diameter radially outwardly from a peripheral edge of an end portion thereof, thereby forming an engagement rib 53*a* (see FIG. 7) to engage with an outer side peripheral edge of the second shaft hole 33*a*.

As shown in FIG. 7, in a state where the resin cover 70, to which the compression coil spring 80 and the torsion coil spring 85 are mounted, is set between the bearing plate 45 of the hinge arm 40 and the receiving plate 33 of the hinge base 20, the support shaft 50 is inserted from an outer side. The engagement rib 53*a* of the receiving seat 53 of the support shaft 50 is engaged with the outer side peripheral edge of the second shaft hole 33*a* of the receiving plate 33. At the same time, the shaft portion 51 is inserted through the fifth shaft hole 71*a* of the resin cover 70, the third shaft hole 45*a* of the hinge arm 40, the fourth shaft hole 61 of the friction plate 60, and the first shaft hole 31*a* of the hinge base 20 to protrude to an outer side of the bearing plate 31. A distal end portion of the shaft portion 51 protruding therefrom is pressed by being swaged etc., thereby forming a catch portion 52 engaging with the outer side peripheral edge of the first shaft hole 31*a*. Accordingly, the support shaft 50 is prevented from being removed and is fixed to the shaft holes. As a result, the compression coil spring 80, supported at the both end portions thereof by the receiving seat 53 of the support shaft 50 and the base plate 71 of the resin cover 70, is retained in a compressed state. Accordingly, the bearing plate 45 of the hinge arm 40 is pressed through the intermediation of the base plate 71. Further, through the intermediation of the friction plate 60, the bearing plate 31 of the hinge base 20 is pressed, and the hinge arm 40 is rotatably connected to the hinge base 20.

Next, a description will be made of a method of assembling the hinge 10 according to the present invention having the above-mentioned structure.

First, the outer tube portion 73 of the resin cover 70 is inserted in the coil winding portion 86, so the torsion coil spring 85 is provided to the outer periphery of the outer tube portion 73. Between the bearing plate 31 and the receiving plate 33 of the hinge base 20, the resin cover 70 is provided. The protruding pieces 79 and 79 on the distal end of the outer tube portion 73 are aligned with the notch portions 33*b* and 33*b* formed in the receiving plate 33. After that, the resin cover 70 is pushed with respect to the receiving plate 33. Each of the protruding pieces 79 is fitted into the notch portion 33*b*, so the distal end portion thereof penetrates the receiving plate 33 through to the outer side. Therefore, the distal end portion of the outer tube portion 73 is locked by being abutted on the inner side peripheral edge of the second shaft hole 33*a*, while the abutting portion 78*a* on the outer periphery of the base plate 71 abuts on the inner side surface of the support plate 30, thereby allowing the resin cover 70 to be temporarily retained by the hinge base 20.

In the state described above, between the base plate 71 of the resin cover 70 and the bearing plate 31 of the hinge base 20, a relatively large space is formed. In this space, the bearing plate 45 of the hinge arm 40 is provided in a state where the mounting portion 43 is directed inwardly, and the insertion tube portion 77 of the resin cover 70 which is temporarily assembled to the hinge base 20 is inserted into the third shaft hole 45*a*. After that, between the bearing plate 31 of the hinge base 20 and the bearing plate 45 of the hinge arm 40, the friction plate 60 is provided in a state where the flash receiving groove 63 side is directed to the bearing plate 31 side. In this state, the resin cover 70 and the hinge arm 40 are moved to the bearing plate 31 side of the hinge base 20 to allow the friction plate 60 to be sandwiched between the bearing plate 45 of the hinge arm 40 and the bearing plate 31 of the hinge base 20, and the shaft holes are aligned with each other.

Note that, as described above, in a case where the resin cover 70 is moved to the bearing plate 31 side, as shown in FIG. 7, a space is formed between the outer tube portion 73 and the receiving plate 33. In this case, the protruding piece 79 is fitted in the notch portion 33*b*, so it is possible to prevent the end portion of the torsion coil spring 85 from falling off in the space. As a result, the interference between the compression coil spring 80 and the torsion coil spring 85 as well as occurrence of abnormal noise or friction can be prevented.

Before the support shaft 50 is inserted into the shaft holes, the compression coil spring 80 is provided to the outer periphery of the support shaft 50. That is, the shaft portion 51 of the support shaft 50 is inserted in the inner periphery of the compression coil spring 80, and the one end portion of the shaft portion 51 is abutted on the receiving seat 53 to be supported, thereby making it possible to mount the compression coil spring 80 to the outer periphery of the support shaft 50. In this manner, by the receiving seat 53 and the shaft portion 51, the compression coil spring 80 can be temporarily retained on the outer periphery of the support shaft 50 in advance. As a result, an assembly workability can be enhanced and the compression coil spring 80 can be supported in a stable manner. Further, in this case, the shaft portion 51 of the support shaft 50 is formed with the diameter-expanding portion 51*b* having the diameter gradually becoming larger toward the receiving seat 53 side. Accordingly, the compression coil spring 80 is moved along the diameter-expanding portion 51*b* to be positioned and mounted to the outer periphery of the support shaft 50, thereby facilitating an assembling operation.

Next, the support shaft 50 on which the compression coil spring 80 is mounted is inserted from its distal end portion into the second shaft hole 33*a* from the outer side of the receiving plate 33 of the hinge base 20. In the above-mentioned step, the protruding pieces 79 are fitted into the notch portion 33*b* in the peripheral edge of the second shaft hole 33*a*. As a result, the center of the second shaft hole 33*a* and the center of the outer tube portion 73 are substantially matched with each other. Accordingly, even the support shaft 50 on which the compression coil spring 80 is mounted can be easily inserted into the outer tube portion 73. The support shaft 50 inserted into the second shaft hole 33*a* is inserted into the outer tube portion 73 and is then inserted into the inner tube portion 75.

At the same time, the compression coil spring 80 is also pushed into the outer tube portion 73. However, at this time, the inner tube portion 75 extends from the base plate 71, so the compression coil spring 80 is guided by the inner tube portion 75, thereby making it possible to smoothly mount the compression coil spring 80 to the outer periphery of the inner tube portion 75.

Further, the insertion shaft portion 51*a* of the support shaft 50 inserted into the inner tube portion 75 is inserted into the insertion tube portion 77 through the fifth shaft hole 71*a* of the base plate 71 and is further inserted through the fourth shaft hole 61 of the friction plate 60 and the first shaft hole 31*a* of the bearing plate 31 of the hinge base 20 to allow the distal end portion thereof to protrude through to the outer side of the bearing plate 31. At the same time, the receiving seat 53 of the support shaft 50 is inserted in the second shaft hole 33a of the receiving plate 33 and the engagement rib 53a is engaged with the outer side peripheral edge of the second shaft hole 33a. In this state, the distal end portion of the support shaft 50 protruding through to the outer side of the bearing plate 31 is swaged to form the catch portion 52. As a result, the catch portion 52 engages with the outer side peripheral edge of the first shaft hole 31a, thereby preventing the support shaft 50 from being removed and fixing the support shaft 50 in position. By the support shaft 50, the hinge arm 40 is rotatably connected to the hinge base 20.

Further, in the above-mentioned state, the both end portions of the compression coil spring 80 are supported by both the receiving seat 53 of the support shaft 50 and the base plate 71 of the resin cover 70, so the compression coil spring 80 is retained in the compressed state. As a result, through the intermediation of the base plate 71 of the resin cover 70, the bearing plate 45 of the hinge arm 40 is pressed, and through the intermediation of the friction plate 60, the bearing plate 31 of the hinge base 20 is pressed. Further, the one arm portion 87 of the torsion coil spring 85 is engaged with the groove portion 36 of the hinge base 20 and the other arm portion 88 is engaged with the groove portion 47 of the hinge arm 40, thereby biasing the hinge arm 40 to rotate with respect to the base 20 in a direction of opening the lid 7.

Next, a description will be made on a method of using the hinge 10 according to the present invention having the above-mentioned structure.

The hinge 10 can be provided to the accommodation portion 3 of the center console 1 by fixing the hinge base 20 to the back surface side of the mounting wall 5 as shown in FIG. 8. Further, the mounting portions 43 of the pair of hinge arms 40 and 40 are fixed to the both side portions in the vicinity of the both ends in a width direction of the lid 7 on a back side thereof. As a result, the pair of hinge arms 40 and 40 are arranged with respect to the hinge base 20 at a large interval, so the lid 7 can be retained in a stable manner.

The opening portion of the accommodation portion 3 can be opened and closed by rotating the lid 7 upwardly and downwardly as shown in FIG. 8 by retaining the distal end portion of the lid 7. In this case, by the compression coil spring 80, through the intermediation of the base plate 71 of the resin cover 70, the bearing plate 45 of the hinge arm 40 is pressed, and through the intermediation of the frictional plate 60, the bearing plate 31 of the hinge base 20 is pressed. Accordingly, due to the upward and downward rotation of the lid 7, both bearing plates 31 and 45 receive resistance against rotation from each other through the intermediation of the friction plate 60, thereby making it possible to retain the lid 7 at an arbitrary opening angle.

Figure 11:
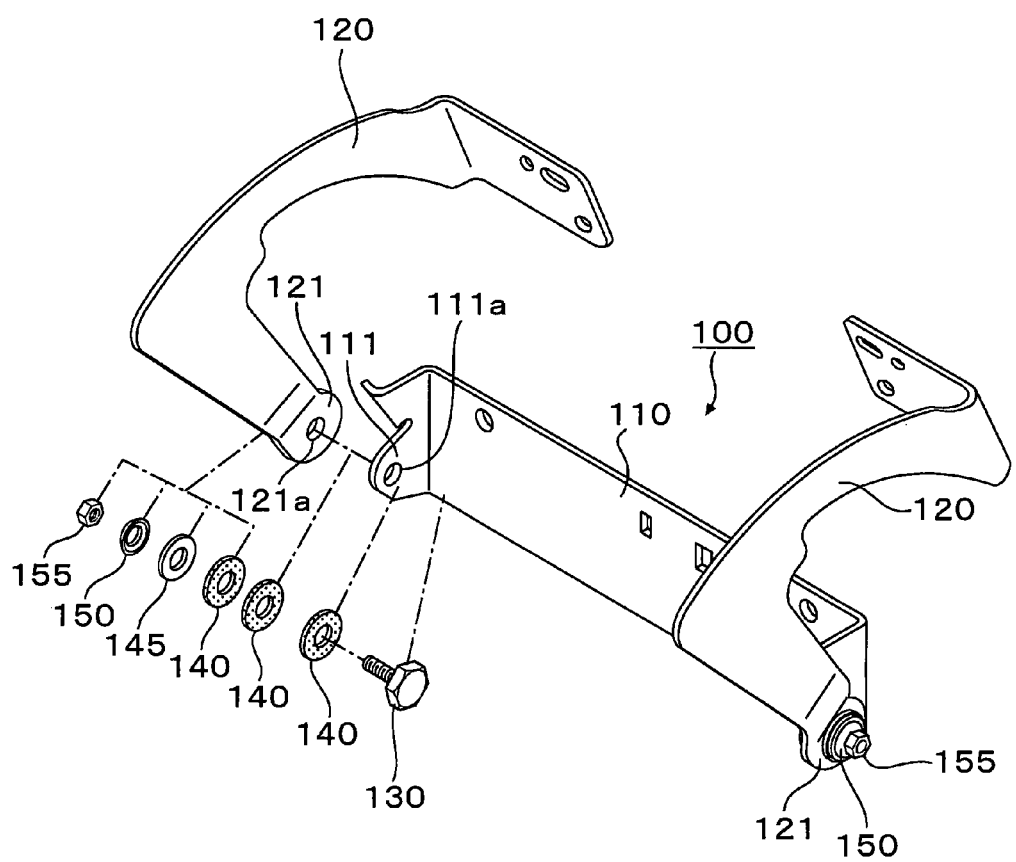
FIG. 11 is an exploded perspective view of a related art free stop hinge.
Figure 12:
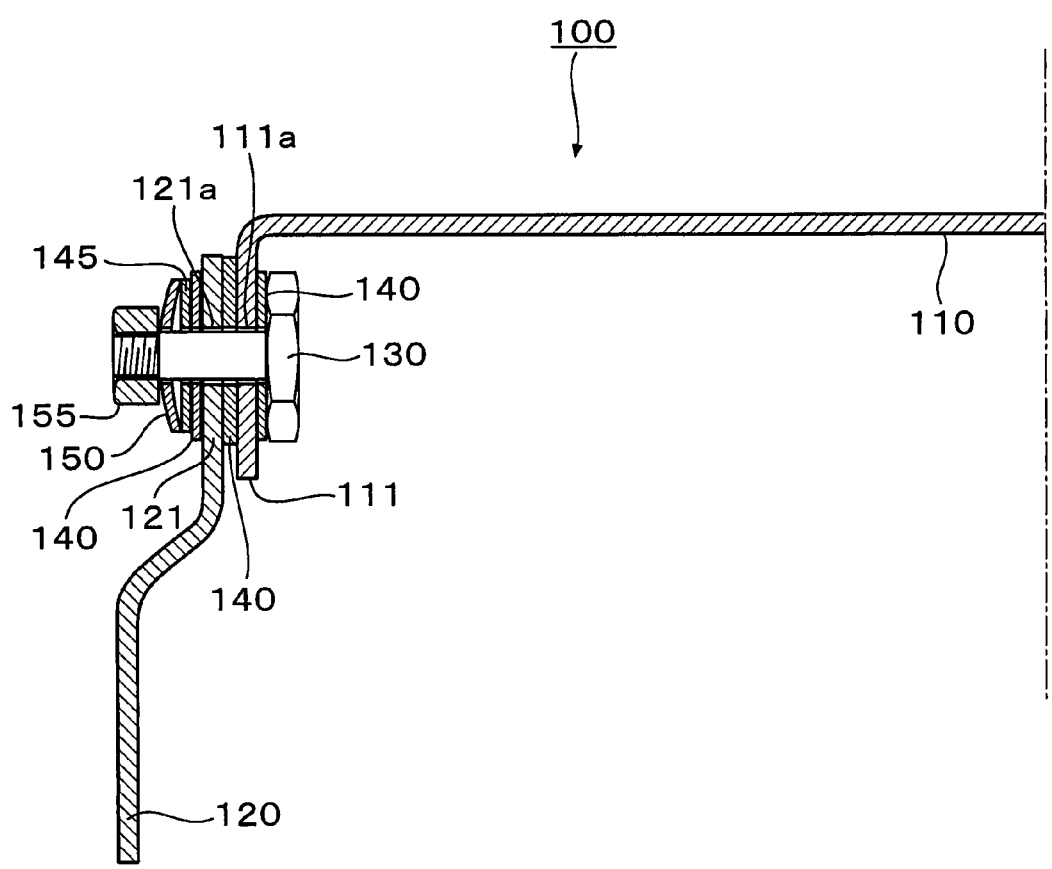
FIG. 12 is a main portion sectional view of the related art free stop hinge.

Further, in the present invention, the compression coil spring 80 is used as the pressing means, so by setting the number of windings, a spring constant, or the like of the compression coil spring 80, the pressing force can be set accurately and uniformly. Further, it becomes easier to adjust the frictional force at the time of rotation of the lid 7 within a range in which the free stopping is possible and a large force is not required for the rotation. Therefore, unlike the hinge 100 of the related art shown in FIGS. 11 and 12, there is no need to do adjustment one after another, for example by the plate spring 150 of the hinge 100, thereby making it possible to enhance the workability.

Further, even in a case where the hinge 40 is rotated with respect to the hinge base 20 by opening and closing the lid 7, in this embodiment, the abutting portion 78a of the resin cover 70 abuts on the inner side surface of the support plate 30 of the hinge base 20 and the pair of protruding pieces 79 and 79 are fitted into the notch portions 33b and 33b provided to the receiving plate 33 of the hinge base 20. Accordingly, rotation of the resin cover 70 is stopped at both ends thereof with respect to the hinge base 20. As a result, relative rotation does not occur between the resin cover 70 and the compression coil spring 80, so it is possible to prevent the compression coil spring 80 from being twisted. Accordingly, an elastic bias force of the compression coil spring 80 can act on the bearing plate 45 of the hinge arm 40 through the intermediation of the base plate 71 of the resin cover 70 in a stable manner.

Further, in this embodiment, the distal end portion of the support shaft 50 is supported by the first shaft hole 31a of the bearing plate 31 and the base end portion thereof is supported by the second shaft hole 33a of the receiving plate 33. Accordingly, the support shaft 50 can be provided to the hinge base 20 in a stable manner. Further, backlash and tilt of the hinge arm 40 which is supported through the intermediation of the support shaft 50 is suppressed, so the rotation operation thereof is performed in a stable manner.

Figure 9:
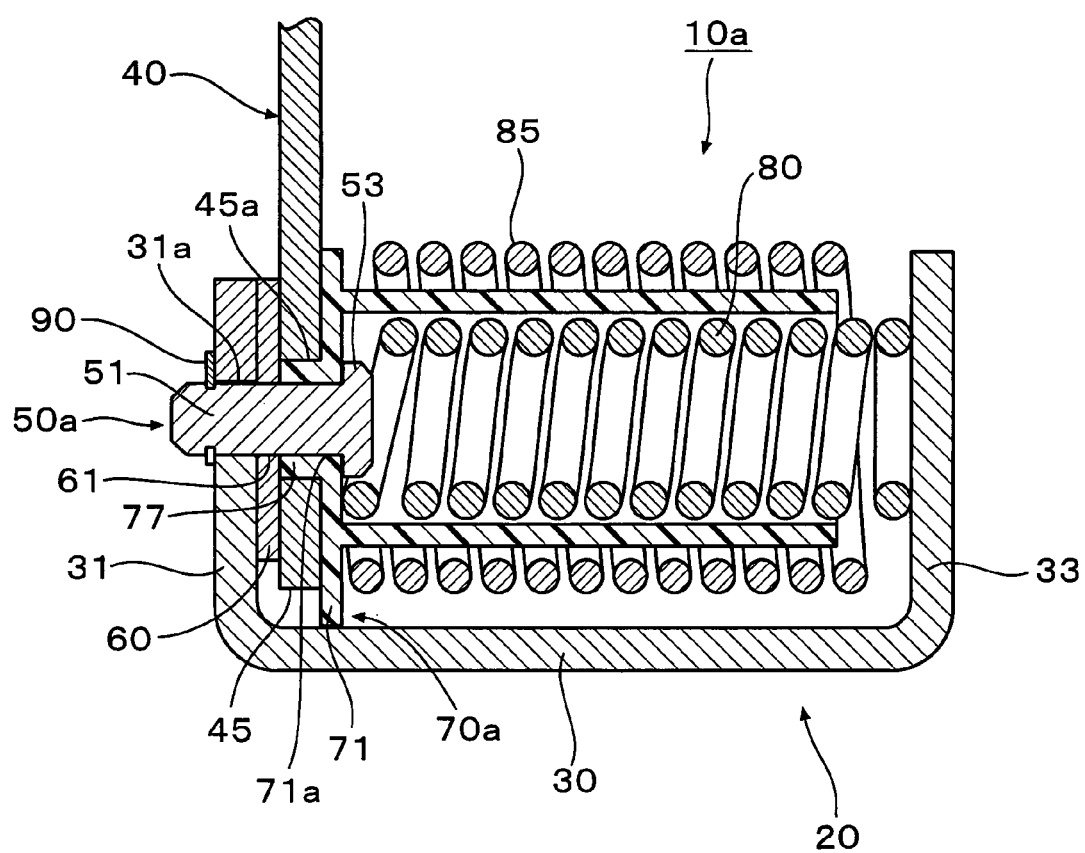
FIG. 9 is a main portion sectional view showing a free stop hinge according to another embodiment of the present invention.

FIG. 9 shows another embodiment of a hinge according to the present invention. Note that, portions substantially the same as those of the above embodiment are denoted by the same reference symbols and descriptions of those are omitted.

A hinge 10a of this embodiment differs, compared to the hinge 10 of the above embodiment, in that the compression coil spring 80 is not supported by the support shaft. That is, the hinge base 20 of the hinge 10a is formed with the bearing plate 31 having the first shaft hole 31a in which the support shaft 50a is inserted and is provided with the receiving plate 33 in a position opposed to the bearing plate 31 at a predetermined distance. The one end portion of the compression coil spring 80 is supported by the inner side surface of the receiving plate 33. Note that, there is not provided the second shaft hole 33a for allowing insertion therethrough of the support shaft, which is formed in the receiving plate 33 of the hinge 10 of the above embodiment. Further, the resin cover 70a is not formed with the inner tube portion 75. On the inner side surface of the base plate 71 of the resin cover 70a, the other end portion of the compression coil spring 80 is supported.

In a state where the torsion coil spring 85 is mounted on the outer periphery of the outer tube portion 73 of the resin cover 70a and the compression coil spring 80 is disposed on the inside of the outer tube portion 73, the insertion tube portion 77 is inserted into the third shaft hole 45a of the bearing plate 45 of the hinge arm 40 and the support shaft 50a is inserted into the fifth shaft hole 71a from the inner side of the base plate 71 and is allowed to pass through the fourth shaft hole 61 of the friction plate 60 and the first shaft hole 31a of the bearing plate 31 of the hinge base 20 to protrude through to the outer side of the bearing plate 31. A C-ring 90 is provided to the distal end portion of the support shaft 50a. As a result, by the C-ring 90 and the receiving seat 53 of the support shaft 50a, the support shaft 50a is fixed to the shaft holes so as not to be removed and the hinge arm 40 is rotatably connected to the hinge base 20.

Further, in this state, the one end portion of the compression coil spring 80 is supported by the inner side surface of the receiving plate 33 of the hinge base 20 and the other end portion thereof is supported by the inner side surface of the base plate 71 of the resin cover 70a. As a result, the compression coil spring 80 is disposed while being compressed between the bearing plate 31 and the receiving plate 33 of the hinge base 20. The compression coil spring 80 presses the bearing plate 45 of the hinge arm 40 toward the friction plate 60 through the intermediation of the base plate 71 of the resin cover 70a, thereby sandwiching the friction plate 60 between the bearing plate 31 and the bearing plate 45. Accordingly, an appropriate frictional force is imparted to the hinge arm 40 against the rotation thereof, thereby realizing the free stopping.

Further, in this embodiment, the both end portions of the compression coil spring 80 is supported between the bearing plate 31 and the receiving plate 33 provided to the hinge base 20, so the compression coil spring 80 can be retained in a stable manner. Further, a set length of the compression coil spring 80 is determined depending upon accuracy of processing of the spring, so a load can be stabilized.

Figure 10:
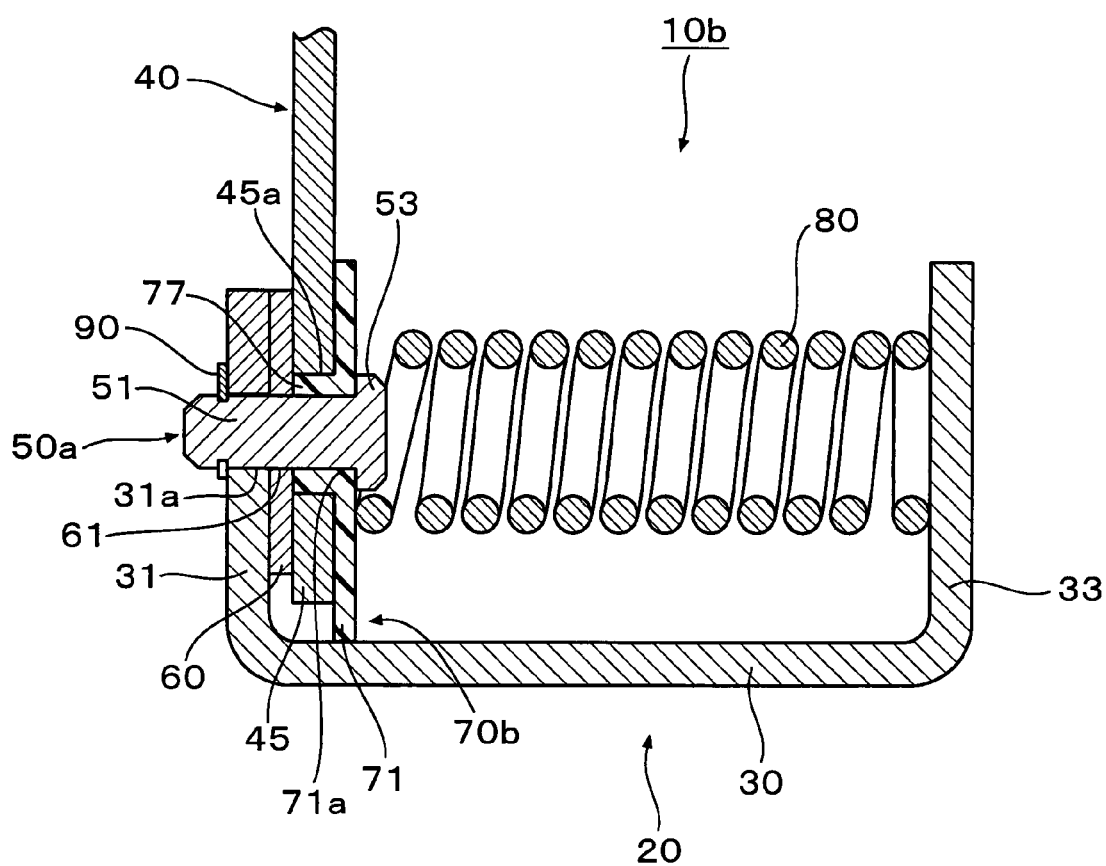
FIG. 10 is a main portion sectional view showing a free stop hinge according to still another embodiment of the present invention.

FIG. 10 shows still another embodiment of a hinge according to the present invention. Note that, portions substantially the same as those of the above embodiments are denoted by the same reference symbols and descriptions of those are omitted.

A hinge 10b of this embodiment differs, compared to the hinge 10a shown in FIG. 9, in shape of the resin cover. That is, a resin cover 70b of this embodiment is not provided with the outer tube portion 73 extending therefrom. Accordingly, the torsion coil spring 85 is also not provided to the resin cover 70b. Note that, in the same manner as that of the embodiment shown in FIG. 9, the one end portion of the compression coil spring 80 is supported by the inner side surface of the receiving plate 33 of the hinge base 20 and the other end portion thereof is supported by the inner side surface of the base plate 71 of the resin cover 70b. In this state, the compression coil spring 80 is disposed while being compressed between the bearing plate 31 and the receiving plate 33 of the hinge base 20.

In this embodiment, only by the frictional force between the friction plate 60 and the bearing plate 45, the hinge arm 40 can be rotated in a free-stop manner. In this embodiment as well, the compression coil spring 80 is disposed while being compressed between the bearing plate 31 and the receiving plate 33 of the hinge base 20, thereby enabling retention of the compression coil spring 80 in a stable manner. Further, there are such advantages that the free stop hinge of this embodiment can be suitably applied to the lid 7 which is relatively light, has a simple structure, and is easily assembled.

What is claimed is:

1. A free stop hinge which can be stopped at any angle for connecting an opening and closing member to a main body portion so that the opening and closing member can be opened and closed with respect to the main body portion and can be stopped at an arbitrary opening angle, the free stop hinge comprising:
a hinge base to be fixed to one of the main body portion and the opening and closing member, the hinge base being provided with a bearing plate having a shaft hole;
a hinge arm to be fixed to the other one of the main body portion and the opening and closing member, the hinge arm being provided with a bearing plate having a shaft hole;
a support shaft inserted through said shaft holes to connect the hinge base and the hinge arm to each other, to thereby support the hinge arm in a rotatable manner with respect to the hinge base;
a friction plate having a shaft hole disposed between the bearing plate of the hinge base and the bearing plate of the hinge arm; and
a compression coil spring, wherein:
the compression coil spring is disposed to press one of the bearing plate of the hinge base and the bearing plate of the hinge arm such that said bearing plate pressed by the compression coil spring is biased to the other one of the bearing plate of the hinge base and the bearing plate of the hinge arm through an intermediation of the friction plate;
the support shaft has a shaft portion inserted through the shaft holes and a receiving seat of a flange shape formed on a base end of the shaft portion;
the compression coil spring is disposed to an outer periphery of the support shaft, a base end portion of the compression coil spring abutting on the receiving seat and a distal end portion of the compression coil spring abutting on the bearing plate;
the hinge base is provided with a receiving plate, said receiving plate being disposed oppositely to the bearing plate of the hinge base at a predetermined interval;
the support shaft has one end thereof inserted and locked in a first shaft hole formed in the bearing plate of the hinge base and the other end thereof inserted and locked in a second shaft hole formed in the receiving plate; and
the compression coil spring is disposed between the bearing plate of the hinge base and the receiving plate.

2. A free stop hinge which can be stopped at any angle for connecting an opening and closing member to a main body portion so that the opening and closing member can be opened and closed with respect to the main body portion and can be stopped at an arbitrary opening angle, the free stop hinge comprising:
a hinge base to be fixed to one of the main body portion and the opening and closing member, the hinge base being provided with a bearing plate having a shaft hole;
a hinge arm to be fixed to the other one of the main body portion and the opening and closing member, the hinge arm being provided with a bearing plate having a shaft hole;
a support shaft inserted through said shaft holes to connect the hinge base and the hinge arm to each other, to thereby support the hinge arm in a rotatable manner with respect to the hinge base;
a friction plate having a shaft hole disposed between the bearing plate of the hinge base and the bearing plate of the hinge arm;
a compression coil spring; and
a resin cover having a shaft hole through which the support shaft is inserted,
wherein:
the compression coil spring is disposed to press one of the bearing plate of the hinge base and the bearing plate of the hinge arm such that said bearing plate pressed by the compression coil spring is biased to the other one of the bearing plate of the hinge base and the bearing plate of the hinge arm through an intermediation of the friction plate;
the resin cover is provided between the compression coil spring and either one of the bearing plates of the hinge base or the hinge arm which is pressed by the compression coil spring;
the resin cover is prevented from rotating with respect to either one of the hinge base or the hinge arm which has the other one of the bearing plates of the hinge base or the hinge arm;
the support shaft has a shaft portion inserted through the shaft holes and a receiving seat of a flange shape formed on a base end of the shaft portion;

the compression coil spring is disposed to an outer periphery of the support shaft, a base end portion of the compression coil spring abutting on the receiving seat and a distal end portion of the compression coil spring abutting on the bearing plate directly or through the resin cover;

the hinge base is provided with a receiving plate, said receiving plate being disposed oppositely to the bearing plate of the hinge base at a predetermined interval;

the support shaft has one end thereof inserted and locked in a first shaft hole formed in the bearing plate of the hinge base and the other end thereof inserted and locked in a second shaft hole formed in the receiving plate; and the compression coil spring is disposed between the bearing plate of the hinge base and the receiving plate.

3. A free stop hinge which can be stopped at any angle for connecting an opening and closing member to a main body portion so that the opening and closing member can be opened and closed with respect to the main body portion and can be stopped at an arbitrary opening angle, the free stop hinge comprising:

a hinge base to be fixed to one of the main body portion and the opening and closing member, the hinge base being provided with a bearing plate having a shaft hole;

a hinge arm to be fixed to the other one of the main body portion and the opening and closing member, the hinge arm being provided with a bearing plate having a shaft hole;

a support shaft inserted through said shaft holes to connect the hinge base and the hinge arm to each other, to thereby support the hinge arm in a rotatable manner with respect to the hinge base;

a friction plate having a shaft hole disposed between the bearing plate of the hinge base and the bearing plate of the hinge arm;

a compression coil spring;

a resin cover having a shaft hole through which the support shaft is inserted; and a torsion coil spring, wherein:

the compression coil spring is disposed to press one of the bearing plate of the hinge base and the bearing plate of the hinge arm such that said bearing plate pressed by the compression coil spring is biased to the other one of the bearing plate of the hinge base and the bearing plate of the hinge arm through an intermediation of the friction plate;

the resin cover is provided between the compression coil spring and either one of the bearing plates of the hinge base or the hinge arm which is pressed by the compression coil spring;

the resin cover is prevented from rotating with respect to either one of the hinge base or the hinge arm which has the other one of the bearing plates of the hinge base or the hinge arm;

the resin cover has a tube portion extending coaxially with the support shaft;

the compression coil spring is disposed on an inner periphery of the tube portion;

the torsion coil spring is disposed on an outer periphery of the tube portion in a circumferential fashion;

the torsion coil spring biases the hinge base and the hinge arm so that the hinge arm rotates with respect to the hinge base in a direction of opening the opening and closing member;

the hinge base is provided with a receiving plate, said receiving plate being disposed oppositely to the bearing plate at a predetermined interval;

the support shaft has one end thereof inserted and locked in a first shaft hole formed in the bearing plate of the hinge base and the other end thereof inserted and locked in a second shaft hole formed in the receiving plate;

the tube portion of the resin cover has a distal end formed with one or more of protruding pieces each axially extending from an end surface thereof;

the second shaft hole has a periphery provided with a notch portion in which the protruding piece fits; and the compression coil spring has an outer diameter which is smaller than an inner diameter of the second shaft hole.

4. A free stop hinge according to claim 3, wherein:

the resin cover has an outer tube portion extending coaxially with the support shaft and has, on an inner side of the outer tube portion, an inner tube portion extending coaxially with the support shaft as well;

the compression coil spring is disposed between the inner tube portion and the outer tube portion; and the torsion coil spring is disposed on an outer periphery of the outer tube portion in a circumferential fashion.

5. A free stop hinge which can be stopped at any angle for connecting an opening and closing member to a main body portion so that the opening and closing member can be opened and closed with respect to the main body portion and can be stopped at an arbitrary opening angle, the free stop hinge comprising:

a hinge base to be fixed to one of the main body portion and the opening and closing member, the hinge base being provided with a bearing plate having a shaft hole;

a hinge arm to be fixed to the other one of the main body portion and the opening and closing member, the hinge arm being provided with a bearing plate having a shaft hole;

a support shaft inserted through said shaft holes to connect the hinge base and the hinge arm to each other, to thereby support the hinge arm in a rotatable manner with respect to the hinge base;

a friction plate having a shaft hole disposed between the bearing plate of the hinge base and the bearing plate of the hinge arm; and a compression coil spring, wherein:

the compression coil spring is disposed to press one of the bearing plate of the hinge base and the bearing plate of the hinge arm such that said bearing plate pressed by the compression coil spring is biased to the other one of the bearing plate of the hinge base and the bearing plate of the hinge arm through an intermediation of the friction plate;

the hinge base is provided with a receiving plate, said receiving plate being disposed oppositely to the bearing plate of the hinge base at a predetermined interval; and the compression coil spring is mounted between the bearing plate of the hinge base and the receiving plate while being compressed by said bearing plate and said receiving plate.

6. A free stop hinge which can be stopped at any angle for connecting an opening and closing member to a main body portion so that the opening and closing member can be opened and closed with respect to the main body portion and can be stopped at an arbitrary opening angle, the free stop hinge comprising:

a hinge base to be fixed to one of the main body portion and the opening and closing member, the hinge base being provided with a bearing plate having a shaft hole;

a hinge arm to be fixed to the other one of the main body portion and the opening and closing member, the hinge arm being provided with a bearing plate having a shaft hole;

a support shaft inserted through said shaft holes to connect the hinge base and the hinge arm to each other, to thereby support the hinge arm in a rotatable manner with respect to the hinge base;

a friction plate having a shaft hole disposed between the bearing plate of the hinge base and the bearing plate of the hinge arm; and a compression coil spring; and a resin cover having a shaft hole through which the support shaft is inserted, wherein:

the compression coil spring is disposed to press one of the bearing plate of the hinge base and the bearing plate of the hinge arm such that said bearing plate pressed by the compression coil spring is biased to the other one of the bearing plate of the hinge base and the bearing plate of the hinge arm through an intermediation of the friction plate;

the resin cover is provided between the compression coil spring and either one of the bearing plates of the hinge base or the hinge arm which is pressed by the compression coil spring;

the resin cover is prevented from rotating with respect to either one of the hinge base or the hinge arm which has the other one of the bearing plates of the hinge base or the hinge arm;

the hinge base is provided with a receiving plate, said receiving plate being disposed oppositely to the bearing plate of the hinge base at a predetermined interval; and the compression coil spring is mounted between the bearing plate of the hinge base and the receiving plate while being compressed by said bearing plate and said receiving plate.

7. A free stop hinge which can be stopped at any angle for connecting an opening and closing member to a main body portion so that the opening and closing member can be opened and closed with respect to the main body portion and can be stopped at an arbitrary opening angle, the free stop hinge comprising:

a hinge base to be fixed to one of the main body portion and the opening and closing member, the hinge base being provided with a bearing plate having a shaft hole;

a hinge arm to be fixed to the other one of the main body portion and the opening and closing member, the hinge arm being provided with a bearing plate having a shaft hole;

a support shaft inserted through said shaft holes to connect the hinge base and the hinge arm to each other, to thereby support the hinge arm in a rotatable manner with respect to the hinge base;

a friction plate having a shaft hole disposed between the bearing plate of the hinge base and the bearing plate of the hinge arm;

a compression coil spring;

a resin cover having a shaft hole through which the support shaft is inserted; and a torsion coil spring, wherein:

the compression coil spring is disposed to press one of the bearing plate of the hinge base and the bearing plate of the hinge arm such that said bearing plate pressed by the compression coil spring is biased to the other one of the bearing plate of the hinge base and the bearing plate of the hinge arm through an intermediation of the friction plate;

the resin cover is provided between the compression coil spring and either one of the bearing plates of the hinge base or the hinge arm which is pressed by the compression coil spring;

the resin cover is prevented from rotating with respect to either one of the hinge base or the hinge arm which has the other one of the bearing plates of the hinge base or the hinge arm;

the resin cover has a tube portion extending coaxially with the support shaft;

the compression coil spring is disposed on an inner periphery of the tube portion;

the torsion coil spring is disposed on an outer periphery of the tube portion in a circumferential fashion;

the torsion coil spring biases the hinge base and the hinge arm so that the hinge arm rotates with respect to the hinge base in a direction of opening the opening and closing member;

the resin cover has an outer tube portion extending coaxially with the support shaft and has, on an inner side of the outer tube portion, an inner tube portion extending coaxially with the support shaft as well;

the compression coil spring is disposed between the inner tube portion and the outer tube portion;

the torsion coil spring is disposed on an outer periphery of the outer tube portion in a circumferential fashion;

the inner tube portion extends to have a length shorter than a length of the outer tube portion; and the support shaft is inserted through an inside of the inner tube portion and provides a portion extruding from the inner tube portion, said portion extruding from the inner tube portion having a tapered shape whose diameter gradually increases.

8. A free stop hinge according to claim 4, wherein:

the inner tube portion extends to have a length shorter than a length of the outer tube portion; and the support shaft is inserted through an inside of the inner tube portion and provides a portion extruding from the inner tube portion, said portion extruding from the inner tube portion having a tapered shape whose diameter gradually increases.

* * * * *